L. A. HOERR.
BRAKE MECHANISM.
APPLICATION FILED OCT. 2, 1913.
1,094,442.
Patented Apr. 28, 1914.
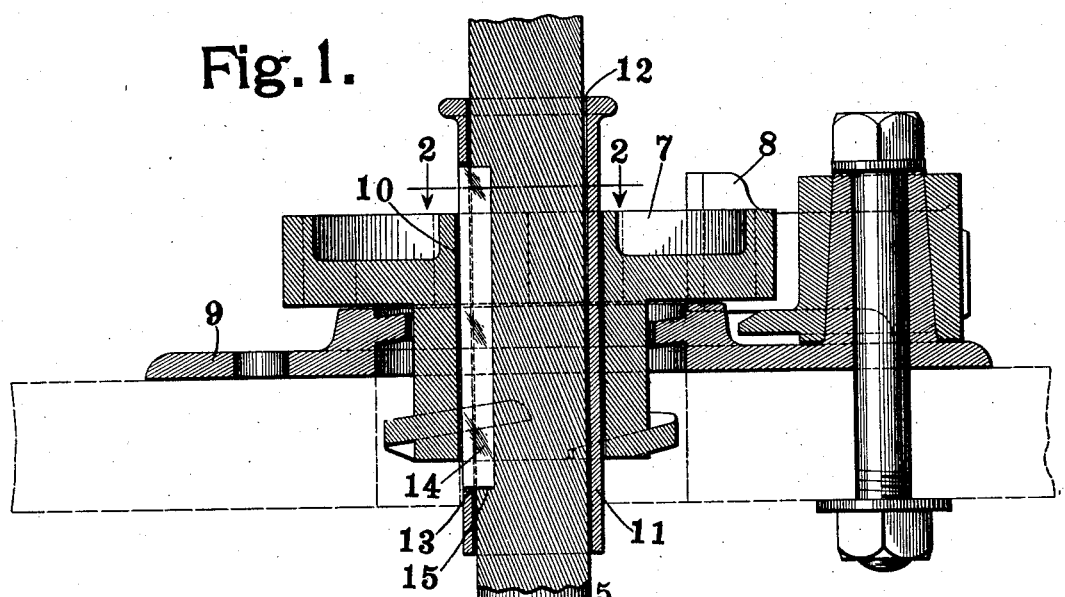
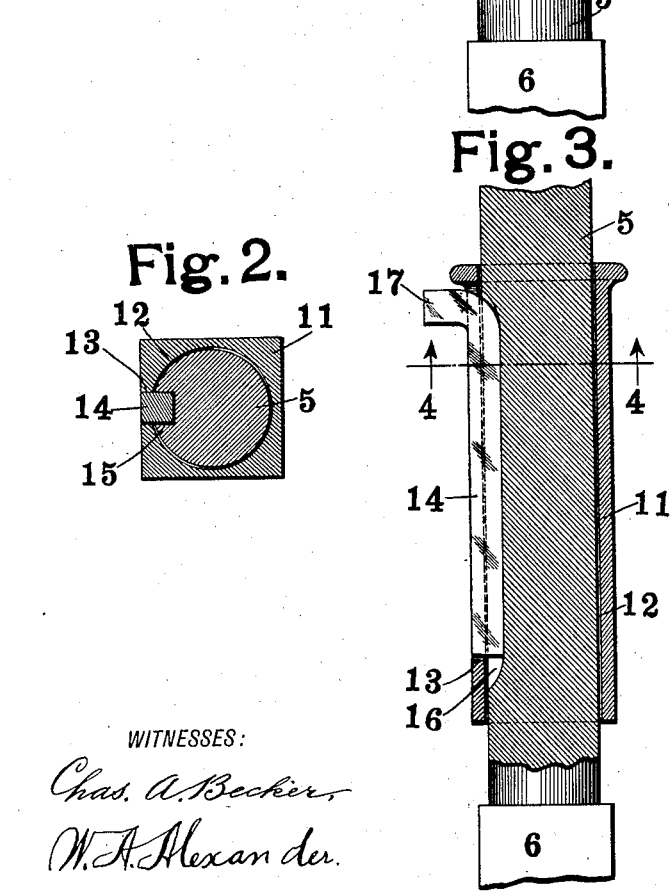
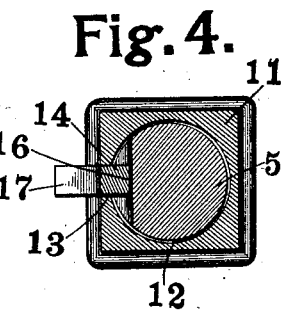
WITNESSES:
Chas. A. Becker
W. A. Alexander
INVENTOR
Louis A. Hoerr,
BY
E. E. Huffman
ATTORNEY

UNITED STATES PATENT OFFICE.

LOUIS A. HOERR, OF ST. LOUIS, MISSOURI.

BRAKE MECHANISM.

1,094,442.   Specification of Letters Patent.   Patented Apr. 28, 1914.

Application filed October 2, 1913. Serial No. 792,920.

*To all whom it may concern:*

Be it known that I, LOUIS A. HOERR, a citizen of the United States of America, residing at the city of St. Louis, State of Missouri, have invented a certain new and useful Brake Mechanism, of which the following is such a full, clear, and exact description as will enable any one skilled in the art to which it appertains to make and use the same, reference being had to the accompanying drawings, forming part of this specification.

My invention relates to a brake mechanism and, more particularly, to means for securing the ratchet wheel of such mechanism to a round brake staff in such manner as to prevent the accidental disengagement of the wheel and staff.

Heretofore, so far as I am aware, round brake staffs have always been secured to their ratchet wheels by passing the staff through a circular opening in the ratchet wheel and securing the two parts together by a key or wedge entering recesses or slots in both parts. The objection to this construction is that the key or wedge is very likely to work out of place, thus allowing the staff to turn freely in the wheel and thus rendering the entire brake mechanism inoperative.

The object of my invention is to provide simple and effective means for overcoming this objectionable feature.

In the accompanying drawings, which illustrate a brake mechanism made in accordance with my invention, Figure 1 is a vertical central section; Fig. 2 is a section taken on the line 2—2 of Fig. 1; Fig. 3 is a vertical section of the staff, sleeve and key, showing a slight modification; and Fig. 4 is a section taken on the line 4—4 of Fig. 3.

Like marks of reference refer to similar parts in the several views of the drawings.

5 represents a brake staff which is circular in cross section and is secured in any suitable manner to the drum 6 upon which the brake chain is wound. The staff 5 passes through the ratchet wheel 7 which, together with the pawl 8, is secured to a base plate 9. The exact construction of the ratchet wheel 7, pawl 8 and base plate 9 will not be described as they form the subject-matter of another application, Serial Number 792,919, of even date herewith.

The ratchet wheel 7, in place of being provided with a circular opening to correspond with the cross section of the brake staff 5, is provided with an angular opening 10 of greater diameter than the said staff 5. In the form of my device shown in the drawings, this opening 10 is square and is adapted to receive a sleeve 11, the exterior of which is square to correspond with the size and shape of the opening 10. The sleeve 11 is provided with a cylindrical opening 12 adapted to receive the brake staff 5. Formed in one side of the sleeve 11 is a slot 13 through which a key 14 projects into a recess formed in the brake staff 5. This recess may be either in the form of a slot 15, as shown in Fig. 2, or it may be made by removing a portion of one side of the staff, as shown at 16 in Fig. 4. In Figs. 3 and 4, I have shown the upper end of the key 14 provided with a projection or finger 17 to assist in removing the key from its position in the sleeve and staff.

In assembling the parts of the device, the key 14 is inserted through the slot 13 of the sleeve into the recess in the brake staff 5 before the parts are placed in position in the angular opening in the wheel 7. It will be evident that the wheel 7 retains the key 14 in position so that it can not be accidentally displaced. In order to remove the key 14, it is necessary to first detach the drum 6 from the staff 5 and to entirely remove the staff and sleeve from the wheel 7.

It will be evident that while my construction is simple and strong, it will effectively prevent the accidental displacement of the key holding the staff to the sleeve 11 and, as the sleeve 11 is angular in form, it cannot turn in the ratchet wheel 7.

Having fully described my invention, what I claim as new and desire to secure by Letters-Patent of the United States is:

1. The combination with a brake staff, of a ratchet wheel coöperating with said staff, a sleeve passing through said wheel and surrounding said staff, and a key securing said sleeve to said staff, said key being held in position by said ratchet wheel.

2. The combination with a brake staff of circular cross section, of a ratchet wheel having an angular opening, a sleeve shaped exteriorly to fit the opening in said wheel and provided with a cylindrical passage to receive said staff, and means for securing said sleeve and staff together, said means being held in position by said wheel.

3. The combination with a brake staff of circular cross section, of a ratchet wheel having a square opening, a sleeve provided with a square exterior to fit the opening in said wheel and having a cylindrical passage to receive said staff, and means for securing said sleeve and staff together, said means being held in position by said wheel.

4. The combination with a brake staff of circular cross section provided with a recess, of a ratchet wheel having an angular opening, a sleeve adapted to fit the opening in said wheel and surrounding said staff, said sleeve being provided with a slot closed at its upper end and a key adapted to project through said slot and into said recess in said staff.

5. The combination with a brake staff, of circular cross section provided with a recess, of a ratchet wheel having an angular opening, a sleeve adapted to fit said opening and surrounding said staff, said sleeve being provided with a slot closed at its upper end and a key passing through said slot and into the recess in said staff, said key being provided with a projecting portion to facilitate its removal.

6. The combination with a brake staff, of a ratchet wheel provided with an opening through which said staff passes, said opening being of greater size than the staff, a member passing through said opening and non-rotatable therein, and means for holding said member in non-rotary relation to said staff, said means being locked against accidental displacement when the parts are in their normal position.

7. The combination with a brake staff, of a ratchet wheel provided with an opening through which said staff passes, said opening being of greater size than said staff, a member passing through said opening and non-rotatable therein, said member being provided with a slot, and a key passing through said slot and holding said member in non-rotary relation to said staff, said key being locked against accidental displacement when the parts are in their normal position.

In testimony whereof, I have hereunto set my hand and affixed my seal in the presence of the two subscribing witnesses.

LOUIS A. HOERR. [L. S.]

Witnesses:
W. A. ALEXANDER,
G. M. SHORE.